United States Patent [19]

Ellis et al.

[11] 4,330,383

[45] May 18, 1982

[54] DIMENSIONALLY STABLE OXYGEN PERMEABLE HARD CONTACT LENS MATERIAL AND METHOD OF MANUFACTURE

[75] Inventors: Edward J. Ellis, Rowley; Louis Mager, Sudbury, both of Mass.

[73] Assignee: Polymer Technology Corporation, Wilmington, Mass.

[21] Appl. No.: 173,102

[22] Filed: Jul. 28, 1980

Related U.S. Application Data

[63] Continuation of Ser. No. 925,709, Jul. 18, 1978, abandoned.

[51] Int. Cl.³ .................... C08J 3/28; C08F 30/08; G02C 7/04
[52] U.S. Cl. .................. 204/159.13; 351/160 R; 526/279; 264/22; 521/149
[58] Field of Search ............................ 204/159.13

[56] References Cited

U.S. PATENT DOCUMENTS

| | | | |
|---|---|---|---|
| 3,700,573 | 10/1972 | Laizier et al. | 204/159.13 |
| 3,700,761 | 10/1972 | O'Driscoll et al. | 264/1 |
| 3,808,178 | 4/1974 | Gaylord | 260/86.1 E |
| 3,916,033 | 10/1975 | Merrill | 427/36 |
| 3,959,102 | 5/1976 | Wajs et al. | 204/159.13 |
| 4,152,508 | 5/1979 | Ellis et al. | 264/1 |

*Primary Examiner*—John C. Bleutge
*Assistant Examiner*—A. H. Koeckert
*Attorney, Agent, or Firm*—Wolf, Greenfield & Sacks

[57] ABSTRACT

Improved contact lens materials are obtained from copolymers containing a siloxanyl alkyl ester vinyl monomer by exposing the materials to high energy radiation thereby reducing the amount of unreacted monomer and residual contaminants.

23 Claims, No Drawings

DIMENSIONALLY STABLE OXYGEN PERMEABLE HARD CONTACT LENS MATERIAL AND METHOD OF MANUFACTURE

This application is a continuation of application Ser. No. 925,709 filed July 18, 1978, now abandoned.

BACKGROUND OF THE INVENTION

In recent years hard contact lens materials having improved oxygen permeability have been developed. Certain such materials are set forth in U.S. Pat. No. 3,808,178 which describes contact lenses fabricated from a copolymer of a polysiloxanyl acrylic ester and an alkyl acrylic ester. Other such hard contact lens materials have been developed. It is sometimes difficult to obtain good dimensional stability in contact lenses made from siloxanyl alkyl ester vinyl monomers.

Dimensional stability is an important property of hard contact lenses and affects both accurate vision correction and wearer comfort. It is known that changes in the dimensions of hard lenses can occur rapidly shortly after cutting and finishing or over a prolonged period of time. Such changes can be of various types. Changes to the base curve or outer curve of a contact lens which changes are uniform are known as "steepening" or "flattening" depending upon the direction of change. A non-uniform change in lens dimension is termed "warpage".

Dimensional changes of the type noted above can result from one or more factors which include the relief of internal stress or strain incurred during manufacture or the takeup or loss of material within the lens. The prior art has developed processes for handling internal stress and strain problems as by the use of careful annealing of lens blanks.

Dimensional stability difficulties have been encountered with gas permeable contact lenses prepared from co or higher polymers containing a siloxanyl alkyl ester vinyl monomer. These difficulties may result from the differences in the reactivity ratios between various monomers employed in the materials and the chain transfer reactions during polymerization. Contact lenses produced from such materials can contain significant portions of unreacted monomer or monomers. This can lead to dimensional instability when these monomers leave the material. The monomers can leave the lenses shortly after making the lenses or over a long period of time. When the monomers leach out during use, this can have toxicological consequences.

SUMMARY OF THE INVENTION

It has now been found that the dimensional stability of polymeric materials useful as contact lenses and containing a siloxanyl alkyl ester vinyl monomer can be greatly increased. The materials can be polymerized by any of the known methods. Such polymerization normally leaves 4% by weight or less, such as typically 1 to 2%, residual unreacted monomer, mixture of monomers, oligimers and other low molecular weight materials which would ordinarily leach out or exude in normal contact lens use and all of which are referred to as unreacted monomer in this application. In a second step, the polymerized material is treated with high energy radiation to increase the degree of polymerization of the unreacted monomer and thereby increase the dimensional stability of the material.

It is an object of this invention to provide a contact lens material having good dimensional stability and which can be formed into contact lens blanks and contact lenses by conventional methods which blanks and lenses have good dimensional stability and minimized unreacted monomer.

It is still another object of this invention to provide a method for improving the dimensional stability of contact lens polymeric materials formed at least in part from siloxanyl alkyl ester vinyl monomer.

It is still another object of this invention to use high energy radiation to treat polymeric materials useful for forming contact lenses, the blanks or the lenses formed from such material, with high energy radiation to improve dimensional stability.

According to the invention a method is provided for improving dimensional stability of polymeric materials useful in forming contact lenses. The method comprises selecting a polymeric material polymerized from a siloxanyl alkyl ester vinyl monomer and at least one comonomer and having a minor amount of unreacted monomer therein. This polymeric material is then exposed to high energy radiation to reduce the amount of unreacted monomer and increase dimensional stability in a second or post polymerization step. The resulting material exhibits good dimensional stability.

Preferably the radiation is in the form of gamma rays with an absorbed dosage of from 0.005 Megarads to 10 Megarads and more preferably in the range of from 1 to 4 Megarads. Preferably the material is irradiated when in the form of lens blanks having thicknesses of up to $\frac{1}{4}$ inch although higher thicknesses can be irradiated. The material in bulk form or the final lens can be irradiated if desired.

It is a feature of this invention that the high energy radiation acts to sterilize the material which may be in the form of contact lenses or blanks. Not only is dimensional stability improved but in many cases physical properties are improved since higher degrees of polymerization are obtained when the second polymerization step is used.

DESCRIPTION OF PREFERRED EMBODIMENTS

Contact lens materials are normally polymerized as in rods and then rough cut to form lens blanks or lens buttons which are then machined to final lens dimensions. The process of this invention can be carried out at any stage of the contact lens manufacture. For example the rods, buttons or lenses can be exposed to radiation. The lenses or buttons which are normally 3/16 inch when irradiated, can be successfully irradiated to increase the degree of polymerization and drive the polymerization reaction closer to 100% reaction without deteriorating the desirable physical properties of the material.

The high energy radiation useful in the present invention generally has an energy per particle or per quantum of from about 15 million electron volts (Me.v.) to about 0.003 Me. v. Any of the known high energy radiation sources can be used as for example those listed below:

| Radiation | Wavelength | Energy per Particle or per quantum |
| --- | --- | --- |
| x-ray | 0.008–40 Å | 1.5–0.003 million electron |

| Radiation | Wavelength | Energy per Particle or per quantum volts (Me.v.) |
|---|---|---|
| gamma ray | 0.0014–1.6 Å | 9.0–0.008 Me.v. |
| accelerated electrons | $5 \times 10^{-2}$–$.08 \times 10^{-2}$ Å | 15–0.25 Me.v. |
| neutron particles | $5 \times 10^{-2}$–$.08 \times 10^{-2}$ Å | 15–0.25 Me.v. |
| alpha particles | $5 \times 10^{-2}$–$.08 \times 10^{-2}$ Å | 15–0.25 Me.v. |

When using gamma rays, the absorbed dosage is preferably in the range of from 0.005 Megarads to 10 Megarads and more preferably in the range of from 1 to 4 Megarads. When using x-rays, the absorbed dosage is within the ranges given for gamma rays while when using electron beam irradiation, the absorbed dosage is preferably in the range of from 0.005 Megarad to 1 Megarad. The time of exposure to irradiation can vary greatly depending upon the particular materials and the type of irradiation. For example, gamma radiation can be carried out for periods of hours as for example 24 hours while electron beam radiation can be obtained in seconds. Preferably the polymeric materials irradiated have been polymerized by conventional polymerization reactions such as free radical reactions to 4% by weight residual or unreacted monomer or less and normally there remains from 1 to 2% by weight of unreacted monomer prior to the irradiation step. The irradiation step preferably carries the degree of polymerization substantially to completion greatly reducing or eliminating any amount of unreacted monomer present in the polymer.

While radiation to polymerize various polymeric materials is known, it is not believed known to use radiation as a second step in the polymerization of contact lenses or contact lens materials. Curing of thin coating formulations for wire insulation and modification of polymeric surfaces through graft polymerization is known in other areas. As long as 20 years ago it was reported in the literature Journal Polymer Science 44 295 (1960) that the effect of gamma radiation on polymethylmethacrylate and polyethylmethacrylate were very dependent on the amount of residual monomer present in a sample polymer. It has also been found that x-ray irradiation of polymethylmethacrylate orthopedic cement results in significant decrease in residual methylmethacrylate content (American Chemical Society, Organic Coatings and Plastics, 37 [2] 205 and 210 1977).

In all cases the irradiation process is preferably carried out at room temperature in an inert atmosphere. Gamma radiation may be obtained from conventional commercial sources such as cobalt 60 and cesium 137. X-ray radiation with energies above those of the bonds of the polymeric material can be easily obtained.

The polymer material useful in the present invention is preferably a highly oxygen permeable contact lens composition as known for example and described in U.S. Pat. No. 3,808,178 issued Apr. 30, 1974 entitled "Oxygen Permeable Contact Lens Composition, Methods and Article of Manufacture" which is incorporated by reference herein in its entirety. That patent describes compositions of matter specially adapted for the production of contact lenses and having increased permeability and comprises solid copolymers of comonomers consisting essentially of: (a) about 10 to 60 parts by weight of a polysiloxanyl alkyl ester of the structure

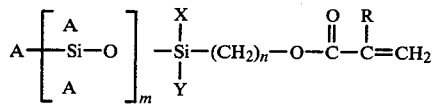

wherein:
(1) X and Y are selected from the class consisting of $C_1$–$C_5$ alkyl groups, phenyl groups and Z groups,
(2) Z is a group of the structure

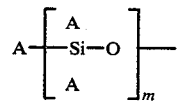

(3) A is selected from the class consisting of $C_1$–$C_5$ alkyl groups and phenyl groups,
(4) R is selected from the class consisting of methyl groups and hydrogen,
(5) m is an integer from one to five, and
(6) n is an integer from one to three; and (b) about 40 to 90 parts by weight of an ester of a $C_1$–$C_{20}$ monohydric alkanol and an acid selected from the class consisting of acrylic and methacrylic acids.

The preferred lens materials for treatment with high energy radiation in accordance with this invention are materials of the type generally described in copending United States patent application Ser. No. 878,163 filed Feb. 15, 1978, now U.S. Pat. No. 4,152,508, entitled "Improved Silicone-Containing Hard Contact Lens Materials" invented by Edward J. Ellis and Joseph C. Salamone and assigned to the same assignee as the present invention. The specification of that application is incorporated by reference herein.

Generally the preferred formulation is an oxygen permeable, hard, machinable dimensionally stable hydrophilic contact lens material of high transparency consisting essentially of a polymer formed from
(a) 30–80% by weight of a siloxanyl alkyl ester monomer having the following formula:

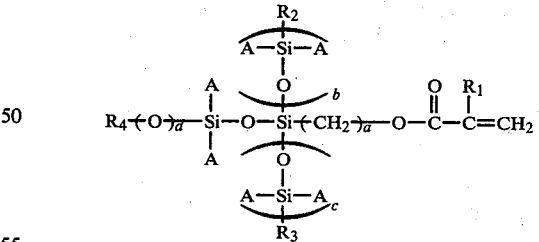

where $R_1$ is selected from the class of hydrogen or methyl groups, "a" is an integer from one to three, "b" and "c" are integers from zero to two, "d" is an integer from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups,
(b) 5 to 60% by weight of an itaconate mono- or di-ester,
(c) 1 to 60 parts by weight of an ester of a $C_1$–$C_{20}$ monohydric or polyhydric alkanol or phenol and an acid selected from the class consisting essentially of acrylic and methacrylic acid, (d) 0.1 to 10% by weight of a cross-linking agent, (e) 1 to 20% by weight of a hydrophilic monomer to impart hydrophilic properties to the surface of the contact lens material of this invention.

Generally the copolymers useful in this invention can be formed from 10 to 90% by weight of a siloxanyl alkyl ester monomer or mixtures thereof, and from 10 to 90% by weight of an itaconate ester or from 10 to 90% by weight of an acrylate or methacrylate ester. Mixtures of an itaconate ester with an acrylate or methacrylate ester totalling 10 to 90% by weight are generally preferred since they exhibit the broader balance of lens properties. Other necessary ingredients as known in the art as initiators, cross-linking agents, wetting agents, colorants and the like can be added to the polymeric materials as is known.

The general formula for useful polymeric materials is as follows:

The siloxanyl alkyl ester monomers useful in this invention preferably have the following formula:

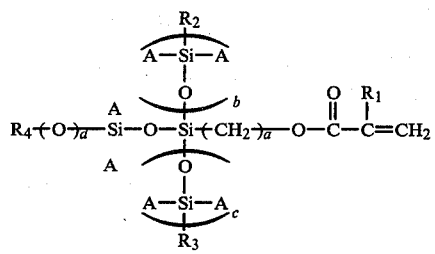

Where $R_1$ is selected from the class of hydrogen or methyl groups, "a" is an integer from one to three, "b" and "c" are integers from zero to two, A is selected from the class of methyl or phenyl groups, $R_3$ and $R_4$ represent either no group (cyclic ring from "c" to "d") or methyl or phenyl groups, "d" is an integer from zero to one.

Representative siloxanyl alkyl ester monomers which could be utilized in this invention include methzcryloyloxymethyl pentamethyldisiloxane

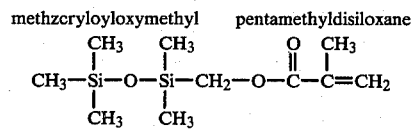

methacryloyloxypropyl tris(trimethylsilyl)siloxane

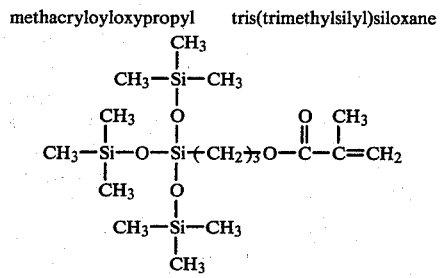

methacryloyloxymethyl heptamethylcyclotetrasiloxane

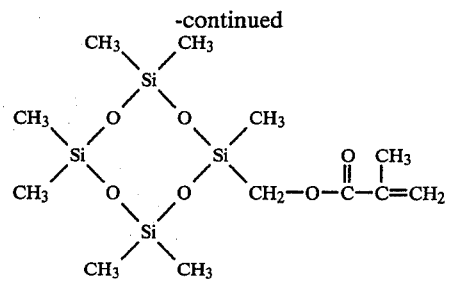

methacryloyloxypropyl heptamethylcyclotetrasiloxane

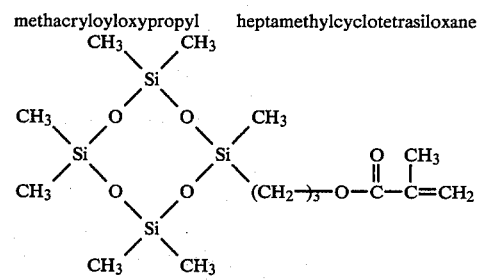

The itaconate esters useful in the present invention have the following structure:

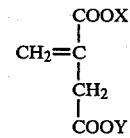

X and Y are the same or different and are hydrogen, methyl or phenyl groups. Representative mono- and di-itaconate esters include:
methyl itaconate
dimethyl itaconate
phenyl itaconate
diphenyl itaconate
methyl phenyl itaconate The fracture strength adding material is an ester of a $C_1$-$C_{20}$ monohydric or polyhydric alkanol, or phenol and an acid selected from the class consisting of acrylic and methacrylic acid. Such esters include:
methyl methacrylate
methyl phenylacrylate
phenyl methacrylate
cyclohexyl methacrylate Examples of cross-linking agents include polyfunctional derivatives of acrylic acid, methacrylic acid, acrylamide, methacrylamide and multi-vinyl substituted benzenes, including but not limited to the following:
ethylene glycol diacrylate or dimethacrylate
diethylene glycol diacrylate or dimethacrylate
tetraethylene glycol diacrylate or dimethacrylate
polyethylene glycol diacrylate or dimethacrylate
trimethylolpropane triacrylate or trimethacrylate
Bisphenol A diacrylate or dimethacrylate
ethoxylated Bisphenol A diacrylate or dimethacrylate
pentaerythritol tri- and tetraacrylate or methacrylate
tetramethylenediacrylate or dimethacrylate
methylene bisacrylamide or methacrylamide
dimethylene bisacrylamide or methacrylamide
N,N'-dihydroxyethylene bisacrylamide or methacrylamide
hexamethylene bisacrylamide or methacrylamide decamethylene bisacrylamide or methacrylamide
divinyl benzene The wettable surface is provided by the inclusion of hydrophilic neutral monomers, hydrophilic cationic monomers and hydrophilic anionic monomers and mixtures of these.

The classes of these compounds are hydrophilic acrylates and methacrylates, acrylamides, methacrylamides, and vinyl lactams. Representative hydrophilic neutral monomers include:

2-hydroxyethyl acrylate or methacrylate
N-vinylpyrrolidone
acrylamide
methacrylamide
glyceryl acrylate or methacrylate
2-hydroxypropyl acrylate or methacrylate
polyethylene glycol monoacrylate or methacrylate The cationic monomers either can be initially in their charged form or are subsequently converted to their charged form after formation of the contact lens. The classes of these compounds are derived from basic or cationic acrylates, methacrylates, acrylamides, methacrylamides, vinylpyridines, vinylimidazoles, and diallyldialkylammonium polymerizable groups. Such monomers are represented by:

N,N-dimethylaminoethyl acrylate and methacrylate
2-methacryloyloxyethyltrimethylammonium chloride and methylsulfate
2-, 4-, and 2-methyl-5-vinylpyridine
2-, 4-, and 2-methyl-5-vinylpyridinium chloride and methylsulfate
N-(3-methacrylamidopropyl)-N,N-dimethylamine
N-(3-methacrylamidopropyl)-N,N-trimethylammonium chloride
1-vinyl- and 2-methyl-1-vinylimidazole
1-vinyl- and 2-methyl-1-vinylimidazolium chloride and methylsulfate
N-(3-acrylamido-3-methylbutyl)-N,N-dimethylamine
N-(3-acrylamido-3-methylbutyl)-N,N,N-trimethylammonium chloride
N-(3-methacryloyloxy-2-hydroxylpropyl)-N,N,N-trimethylammonium chloride
diallyldimethylammonium chloride and methylsulfate The anionic monomers either are in their neutral form initially or are subsequently converted to their anionic form. These classes of compounds include polymerizable monomers which contain carboxy, sulfonate, and phosphate or phosphonate groups. Such monomers are represented by:

acrylic acid
methacrylic acid
sodium acrylate and methacrylate
vinylsulfonic acid
sodium vinylsulfonate
p-styrenesulfonic acid
sodium p-styrenesulfonate
2-methacryloyloxyethylsulfonic acid
3-methacryloyloxy-2-hydroxypropylsulfonic acid
2-acrylamido-2-methylpropanesulfonic acid
allylsulfonic acid
2-phosphatoethyl methacrylate The copolymers described in this invention are prepared by radical polymerization through the incorporation of a free radical initiator. The initiator is chosen from those commonly utilized to polymerize vinyl type monomers and would include the following representative initiators:

2,2'-azo-bis-isobutyronitrile
4,4'-azo-bis-(4-cyanopentanoic acid)
t-butyl peroctoate
benzoyl peroxide
lauroyl peroxide
methyl ethyl ketone peroxide
diisopropyl peroxycarbonate The free radical initiator is normally used in amounts of from 0.01 to 2% by weight of the entire compound.

The materials of this invention can be polymerized directly in a suitable mold to form contact lenses. The materials are all thermosetting and thus various methods of fabrication can be used. It is preferable to polymerize into sheet or rod stock from which contact lenses may be machined.

It is preferred to use the conventional approach when forming contact lenses such as used for polymethyl methacrylate (PMMA). In this approach, the formulations are polymerized directly into a sheet or rod and the contact lens blanks are cut as buttons, discs or other preformed shapes which are then machined to obtain the lens surfaces and the final lens form. The resulting polymeric stock of buttons possesses the optical qualities necessary to produce aberration-free oxygen permeable, hard contact lenses in accordance with this invention.

Of course when referring to the polysiloxanyl alkyl ester vinyl monomer in the polymers of this invention, more than one can be used in place of a single monomer as is true with each of the monomeric recitations. Thus one or two itaconate esters can be used in place of a single ester if desired.

The following examples are given to illustrate the invention and are not to be considered limiting thereof:

EXAMPLE I

A hard, oxygen permeable contact lens formulation was prepared from a comonomer mixture of dimethyl itaconate (DMI), methyl methacrylate (NMA), methacryloyl oxypropyl tris(trimethylsilyl) siloxane (TRIS), methacrylic acid (MA), and tetraethylene glycol dimethacrylate (TEGDM) using the free radical initiator 2,2'-azobisisobutyronitrile (AIBN). The formulation components (shown in TABLE I in parts by weight) were thoroughly mixed, transferred to test tubes, stoppered, degassed, then filled with nitrogen. The test tubes were then placed in a water bath at 40° C. and allowed to polymerize for two days. The tubes were then placed in a 60° C. oven for an additional two days, after which the solid rods are removed from the tubes. The rods were then subjected to conditioning for approximately eighteen hours at 100° C. under vacuum then slowly cooled to room temperature to produce a stress-free material. The conditioned rods were then machined to discs of the size 3/16" by ½", which are of the conventional form for hard polymethyl methacrylate lens blanks.

The finished discs were then subjected to gamma radiation in a Gamma Cell 200 instrument (made by Atomic Energy of Canada Limited of Ottawa, Canada). The cell contained 1230 curies of Cobalt 60 in the form of 20 pencils which produced a central dose rate of $2.12 \times 10^5$ rads per cm$^3$ per hour. The discs were irradiated under a nitrogen atmosphere and the total time of exposure was adjusted to produce a total dose absorbed in the material of from $1 \times 10^6$ rads (1 MR) to $5 \times 10^6$ rads (5 MR).

Both irradiated and non-irradiated discs were subjected to distilled water extraction for 6 hours at 75° C. The extract was diluted to 100 ml with distilled water and ultra violet absorbance measurements were performed at three wavelengths. The data in TABLE I clearly demonstrate the ability of gamma radiation to significantly reduce the content of extractable (residual) material i.e. unreacted monomer, in the lens blanks.

TABLE I

| FORMULATION (parts by weight) | |
|---|---|
| DMI | 27.5 |
| MMA | 27.5 |
| TRIS | 45.0 |
| TEGDM | 3.0 |
| MA | 5.0 |
| AIBN | 0.2 |

| | | UV Absorbance of extract | | |
|---|---|---|---|---|
| Radiation level | Sample weight, gms (grams) | 205 nm | 215 nm | 245 nm (nanometers) |
| 0 MR, control | 3.343 | 0.775 | 0.395 | 0.0795 |
| 1 MR | 3.330 | 0.214 | 0.122 | 0.025 |
| 2 MR | 3.400 | 0.089 | 0.052 | 0.015 |
| 3 MR | 3.410 | 0.075 | 0.041 | 0.0115 |
| 4 MR | 3.409 | 0.045 | 0.0225 | 0.009 |
| 5 MR | 3.371 | 0.0315 | 0.015 | 0.003 |

EXAMPLE II

The hard, oxygen permeable lens formulation given in TABLE II was prepared using the experimental procedures detailed in Example I. The lens blanks were gamma irradiated under a nitrogen atmosphere to various total delivered dosages. Contact lenses were prepared from these discs utilizing techniques which are common in the manufacture of hard contact lenses. The test lenses were standardized to the following prescription:

| Base curve radius | 7.95 mm |
|---|---|
| Power | −7.0 diopters |
| Central thickness | 0.12 mm |
| Diameter | 12 mm |

The base curve of each lens was noted after manufacture and rechecked after two days immersion in distilled water. The change in the base curve radius as a function of radiation dosage is presented in TABLE II and illustrates the effectiveness of the gamma radiation process as a means for imparting dimensional stability to contact lens.

TABLE II

| Formulation (parts by weight) | |
|---|---|
| DMI | 27.5 |
| MMA | 27.5 |
| TRIS | 45.0 |
| TEGDM | 5.0 |
| MA | 5.0 |
| AIBN | 0.2 |

| Radiation dosage | Original* base curve, mm | Base curve* After soak, mm | Dimensional change, mm |
|---|---|---|---|
| 0 MR, control | 7.94–7.96 | 8.04–8.08 | 0.09–0.12 flattening |
| 3 MR | 7.94–7.96 | 7.97–8.01 | 0.03–0.05 flattening |
| 5 MR | 7.94–7.96 | 7.94–7.97 | 0.00–0.02 flattening** |

*average of several test lenses
**within acceptable limits

EXAMPLE III

The hard, oxygen permeable lens formulations given in TABLE III were prepared using the experimental procedures detailed in Example I. The lens blanks were gamma irradiated under a nitrogen atmosphere to various total delivered dosages. Compressive strength at yield was determined using a TINIUSOLSEN testing machine under the following conditions:

Sample size—3/16″ × ½″
Temperature—73° F.
Testing rate—0.05 in/min

Multiple determinations were made and the average values are reported in TABLE III. It is evident from the data that the compressive strength of the lens materials is significantly improved by radiation treatment at total levels as low as 2 Megarads.

TABLE III

| Formulation (parts by weight) | | | |
|---|---|---|---|
| | A | B | C |
| DMI | 27.5 | 27.5 | 27.5 |
| MMA | 27.5 | 27.5 | 27.5 |
| TRIS | 45.0 | 45.0 | 45.0 |
| TEGDM | 3.0 | 4.0 | 5.0 |
| MA | 5.0 | 5.0 | 3.0 |
| DMAEM* | — | — | 2.0 |
| AIBN | 0.2 | 0.2 | 0.2 |

*dimethyl aminoethyl methacrylate

| | Compressive strength at yield (psi) | | | | | |
|---|---|---|---|---|---|---|
| Sample | 0 MR | 2 MR | 4 MR | 6 MR | 8 MR | 10 MR |
| A | 12,730 | 13,340 | 13,240 | 13,290 | 13,450 | 13,500 |
| B | 10,965 | 12,430 | 12,270 | 12,170 | 12,020 | 12,120 |
| C | 9,270 | 12,070 | 11,710 | 12,320 | 12,220 | 11,920 |

Average deviation ± 200 psi

EXAMPLE IV

The hard oxygen permeable lens formulation given in Table III was prepared using the procedure detailed in Example I. The lens blanks were irradiated with both electron beam and with gamma while under a nitrogen atmosphere.

Standard permeability samples in the form of plano contact lenses were machined from these samples to the following prescription:

| Base curve radius | 8.00 mm |
|---|---|
| Power | Plano |
| Central Thickness | .20 mm |
| Diameter | 12.0 mm |

Permeability was measured in an instrument designed after ASTM D1434-66 wherein one side of the sample is subjected to pure oxygen at a pressure of one atmosphere above atmospheric. The oxygen that permeates through the lens sample is allowed to expand on the other side of the sample against atmospheric pressure in a capillary tube plugged with a droplet of mercury. Rate of motion of the mercury plug is easily converted into volume of permeant per unit time.

The system was calibrated by measurements made on materials of known permeability.

Multiple determinations were made and average values are reported in Table IV. This table shows that useful O₂ permeability values are maintained after irradiation.

TABLE IV

| Megarads Radiation Dose | Radiation Type | Permeability* |
|---|---|---|
| 0 | — | 148 |
| .005 | Electron Beam | 119 |
| .02 | " | 131 |
| .05 | " | 134 |
| .1 | " | 118 |
| 1 | Gamma | 119 |
| 2 | " | 119 |
| 3 | " | 115 |
| 4 | " | 114 |
| 5 | " | 110 |

*Permeability is given as $10^{10}$ cm³-mm/sec,cm²,cmHg

While specific examples of this invention have been shown and described, many variations are possible. Such variations include the use of mixtures of monomers within the components to make up the required percentages of each. For example, two or more siloxanyl alkyl ester monomers can be used instead of a single such monomer for that component of the system. Similarly, two or more cross-linking agents can be used. Conventional additives to the lenses such as colorants, tints and the like may also be employed within the normal ranges of such materials. In all cases, high energy radiation is used to act as a second step or post polymerization in an attempt to substantially completely polymerize polymeric material and thus improve dimensional stability and lower unreacted monomer to ½% by weight or less.

It is preferred that the contact lenses of the present invention and the materials from which they are made have an oxygen permeability in the range of from 38 to 500 cm³mm/cm²/sec. cm Hg $\times 10^{-10}$ and a Rockwell hardness value of from 100 to 125 ASTM d-785 R scale and be formed of a polymer of dimethyl itaconate, methylmethacrylate, methacryloxyloxypropyl tris(-trimethylsilyl)siloxane, methacrylic acid and tetraethylene glycol dimethacrylate. Such lenses can be worn in the eye of a user for long time periods.

What is claimed is:

1. A method of improving dimensional stability of polymeric materials useful for hard contact lenses, said method comprising selecting a polymeric material formed from a siloxanyl alkyl ester vinyl monomer and at least one other organic unsaturated copolymeric monomer to a solid state having a minor amount of unreacted monomer and exposing said material to high energy radiation to reduce the amount of unreacted monomer and improve dimensional stability.

2. A method in accordance with the method of claim 1 wherein said polymeric material is an oxygen permeable material.

3. A method in accordance with the method of claim 1 wherein said polymeric material consists essentially of a polymer formed from (a) 30–80% by weight of a siloxanyl alkyl ester monomer having the following formula:

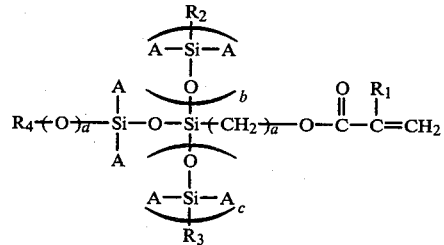

wherein $R_1$ is selected from the class of hydrogen or methyl groups, "a" is an integer from one to three, "b" and "c" are integers from zero to two, "d" is an integer from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups.

(b) 5 to 60% by weight of an itaconate mono- or di-ester, (c) 1 to 60 parts by weight of an ester of a $C_1$-$C_{20}$ monohydric or polyhydric alkanol or phenol and an acid selected from the class consisting essentially of acrylic and methacrylic acid, (d) 0.1 to 10% by weight of a cross-linking agent, (e) 1 to 20% by weight of a hydrophilic monomer to impart hydrophilic properties to the surface of the contact lens material of this invention.

4. A method in accordance with claim 3 wherein said siloxanyl alkyl ester monomer (a) is present in an amount of from 40 to 55% by weight, said itaconate ester (b) is present in an amount of from 20 to 40% by weight, said ester (c) is present in an amount of from 20 to 40% by weight, said cross-linking agent is present in an amount of from 0.1 to 10% by weight, and said hydrophilic monomer is present in an amount of from 1 to 20% by weight of the entire composition.

5. A method of improving dimensional stability of materials useful for hard contact lenses, said method comprising selecting a polymeric material which is a solid copolymer of comonomers consisting essentially of:

(a) about 10 to 60 parts by weight of a polysiloxanylalkyl ester of the structure

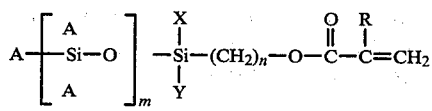

wherein:

(1) X and Y are selected from the class consisting of $C_1$-$C_5$ alkyl groups, phenyl groups and Z groups, (2) is a group of the structure

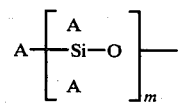

(3) A is selected from the class consisting of $C_1$-$C_5$ alkyl groups and phenyl groups, (4) R is selected from the class consisting of methyl groups and hydrogen,
(5) m is an integer from one to five, and
(6) n is an integer from one to three; and
(b) about 40 to 90 parts by weight of an ester of a $C_1$-$C_{20}$ monohydric alkanol and an acid selected from the class consisting of acrylic and methacrylic acids, said copolymer having a small amount of unreacted monomer, and exposing said copolymer to high energy radiation to reduce the amount of unreacted monomer and improve dimensional stability.

6. A method of improving dimensional stability of materials useful for hard contact lenses, said method comprising selecting a solid copolymeric material from a siloxanyl alkyl ester vinyl monomer and monomer selected from the group consisting essentially of itaconate ester, acrylate ester, methacrylate ester and mixtures thereof, and treating said material with high energy radiation to reduce the amount of unreacted monomer and improve dimensional stability.

7. A method in accordance with the method of claim 6 wherein said siloxanyl alkyl ester vinyl monomer has the following formula:

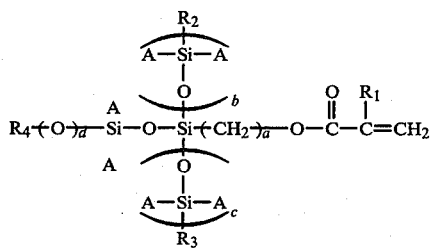

where $R_1$ is selected from the class of hydrogen or methyl groups, "a" is an integer from one to three, "b" and "c" are integers from zero to two, A is selected from the class of methyl or phenyl groups, $R_2$ is selected from the class of methyl or phenyl groups, $R_3$ and $R_4$ represent either no group (cyclic ring from "c" to "d") or methyl or phenyl groups, "d" is an integer from zero to one.

8. A method in accordance with the method of claim 1 wherein said high energy radiation is gamma radiation and said polymeric material absorbs from 0.005 Megarads to 10 Megarads of said radiation.

9. A method in accordance with the method of claim 3 wherein said high energy radiation is gamma radiation and said polymeric material absorbs from 0.005 Megarads to 10 Megarads of said radiation.

10. A method in accordance with the method of claim 5 wherein said high energy radiation is gamma radiation and said polymeric material absorbs from 0.005 Megarads to 10 Megarads of said radiation.

11. A method in accordance with the method of claim 6 wherein said high energy radiation is gamma radiation and said polymeric material absorbs from 0.005 Megarads to 10 Megarads of said radiation.

12. A method in accordance with the method of claim 1 wherein said high energy radiation is selected from the class consisting of x-ray radiation, gamma ray radiation, accelerated electron radiation, neutron particle radiation and alpha particle radiation.

13. A method in accordance with the method of claim 3 wherein said high energy radiation is selected from the class consisting of x-ray radiation, gamma ray radiation, accelerated electron radiation, neutron particle radiation and alpha particle radiation.

14. A method in accordance with the method of claim 5 wherein said high energy radiation is selected from the class consisting of x-ray radiation, gamma ray radiation, accelerated electron radiation, neutron particle radiation and alpha particle radiation.

15. A method in accordance with the method of claim 6 wherein said high energy radiation is selected from the class consisting of x-ray radiation, gamma ray radiation, accelerated electron radiation, neutron particle radiation and alpha particle radiation.

16. A method in accordance with the method of claim 3 wherein said polymeric material contains no more than about 4% by weight of unreacted monomer prior to said exposure to high energy radiation and less than ½% by weight of unreacted monomer after exposure to said high energy radiation.

17. A method in accordance with the method of claim 5 wherein said polymeric material contains no more than about 4% by weight of unreacted monomer prior to said exposure to high energy radiation and less than ½% by weight of unreacted monomer after exposure to said high energy radiation.

18. A method in accordance with the method of claim 6 wherein said polymeric material contains no more than about 4% by weight of unreacted monomer prior to said exposure to high energy radiation and less than ½% by weight of unreacted monomer after exposure to said high energy radiation.

19. A method in accordance with the method of claim 1 wherein said polymeric material comprises a siloxanyl alkyl ester material and contains no more than about 4% by weight of unreacted monomer prior to said exposure to high energy radiation and less than ½% by weight of unreacted monomer after exposure to said high energy radiation.

20. The product produced by the process of claim 1.
21. The product produced by the process of claim 3.
22. The product produced by the process of claim 5.
23. The product produced by the process of claim 6.

* * * * *